S. C. CATLIN.
Liquid Measure.
No. 110,202.
Patented Dec. 20, 1870.
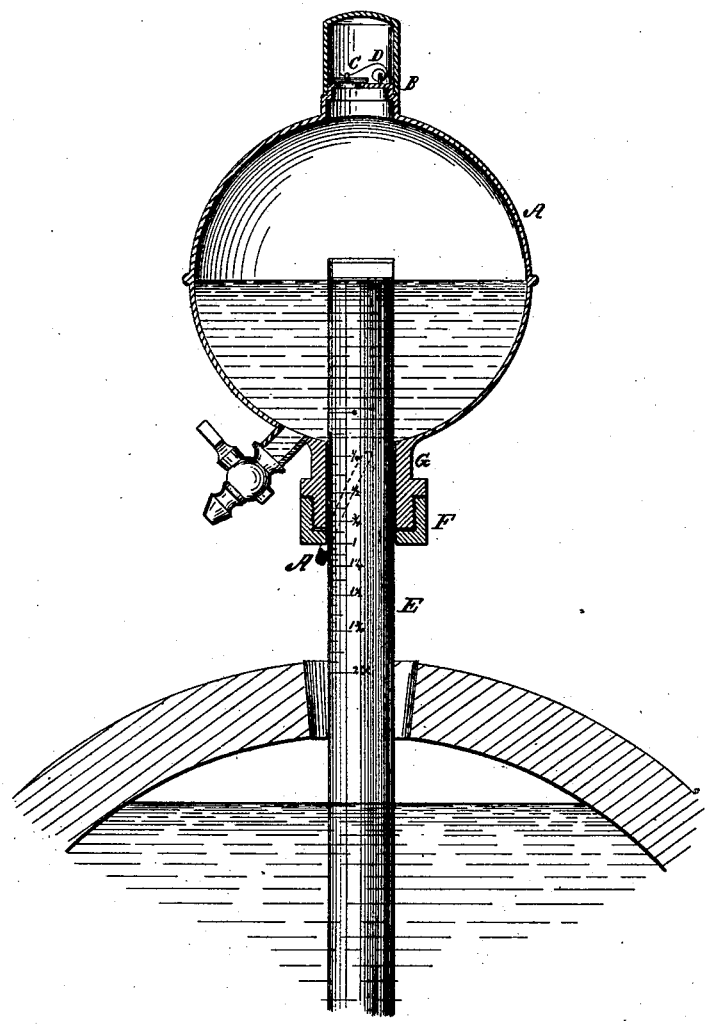

United States Patent Office.

SETH C. CATLIN, OF CLEVELAND, OHIO.

Letters Patent No. 110,202, dated December 20, 1870; antedated December 16, 1870.

IMPROVEMENT IN LIQUOR-THIEVES AND MEASURES.

The Schedule referred to in these Letters Patent and making part of the same.

*To all whom it may concern:*

Be it known that I, SETH C. CATLIN, of Cleveland in the county of Cuyahoga and State of Ohio, have invented a new and useful Improvement in Thief and Liquid Measure; and I hereby declare that the following is a full, clear, and exact description thereof, which will enable others skilled in the art to make and use the same, reference being had to the accompanying drawing forming part of this specification.

The object of this invention is to furnish an instrument for taking liquids from barrels or other vessels for samples, and for measuring the same, so that much time and trouble may be saved; and It consists in a hollow globe or sphere provided with a valve-chamber and valve, and with a graduated and adjustable induction-tube and delivery-cock, the whole arranged and operating as hereinafter more fully described.

The accompanying drawing represents the globe and valve-chamber in vertical section, with the induction-tube and delivery-cock connected therewith.

A is the globe.

B is the valve-chamber, attached to the top of the globe.

C is the valve, which opens upward and is pressed down to its seat by the spring D.

E is the induction-tube, which passes up through the stuffing-box F.

This stuffing-box screws onto the neck G of the globe, and by means of it a water-tight joint around the induction-tube E is formed.

This tube is adjustable in the neck of the globe, and is held in place, when adjusted for measuring any particular quantity of liquid, by the friction produced by the stuffing-box.

The tube is marked off or graduated, as seen in the drawing, so that the exact quantity of liquid remaining below the top end of the tube will be indicated by the mark which corresponds with the gauge.

H is the gauge, which is in the form of a bail, pivoted to the neck G. When it drops down its lower portion, or the handle of the bail, strikes the tube and the tube is adjusted to correspond therewith.

The mode of filling the globe or introducing the liquid is as follows:

The operator holds the globe in his hands and inserts the induction-tube in the bung-hole of the barrel beneath the surface of the liquid, as seen in the drawing, and then churns the instrument up and down in the liquid a few times. As the liquid rises in the tube the air will be forced upward and out through the valve. A very few up-and-down strokes are sufficient to fill the globe with liquid.

As seen in the drawing, the tube is adjusted or set to measure one and one-fourth gallon. Now all the liquid in the globe above that quantity will immediately return through the tube into the vessel as soon as the churning ceases.

The discharge-cock I is now opened, and the liquid is delivered into a jug or other receptable without waste or delay.

The instrument is used for withdrawing liquids for samples in the manner described, and takes the place of what is known among distillers and liquor dealers as the "thief," for sampling and testing liquors.

Having thus described my invention,

I claim as new, and desire to secure by Letters Patent—

1. The combination of the globe A, tube E, and valve C, when the same are arranged to operate substantially as and for the purposes herein shown and described.

2. A liquid measure or thief, consisting of a tube open at both ends and connected with a valve-receptacle for the liquid to be tested or measured, as shown and described, all arranged to operate as specified.

SETH C. CATLIN.

Witnesses:
JOHN VOGEL, Jr.,
E. G. CATLIN.